United States Patent Office 2,954,667
Patented Oct. 4, 1960

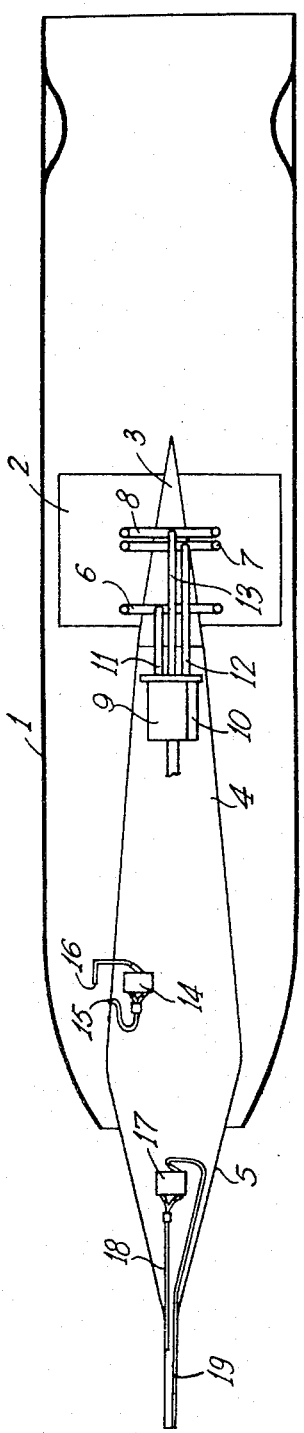
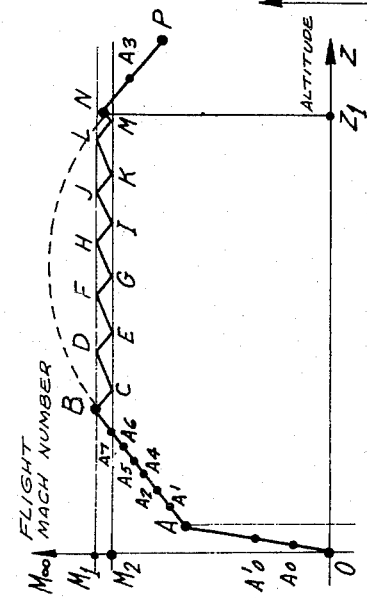

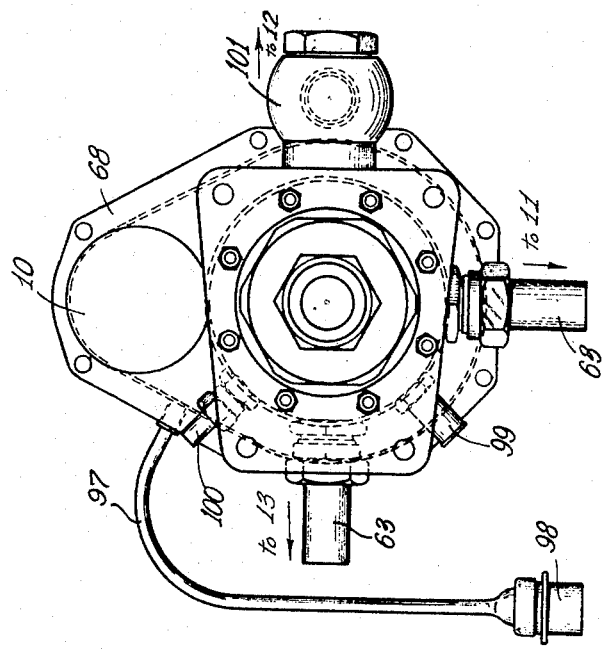
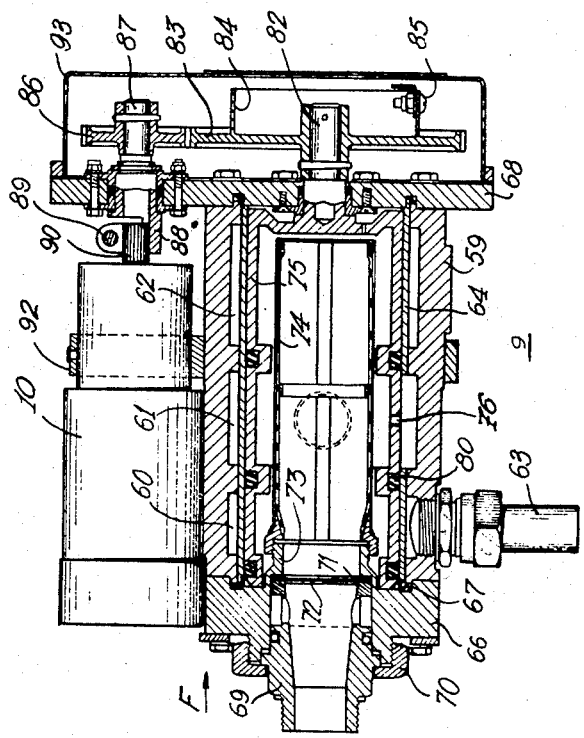

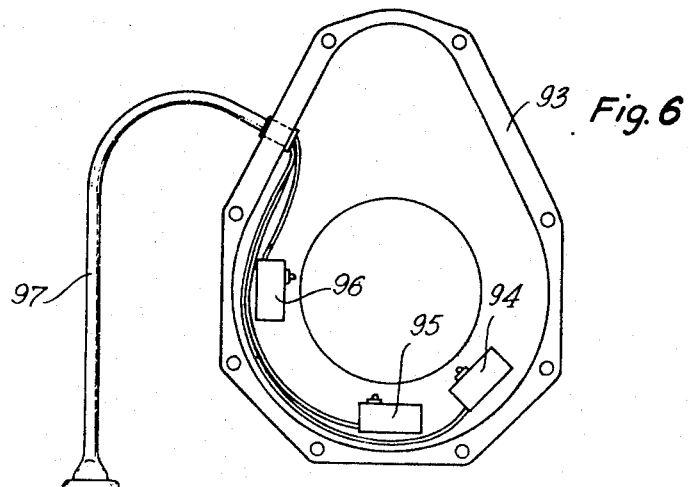
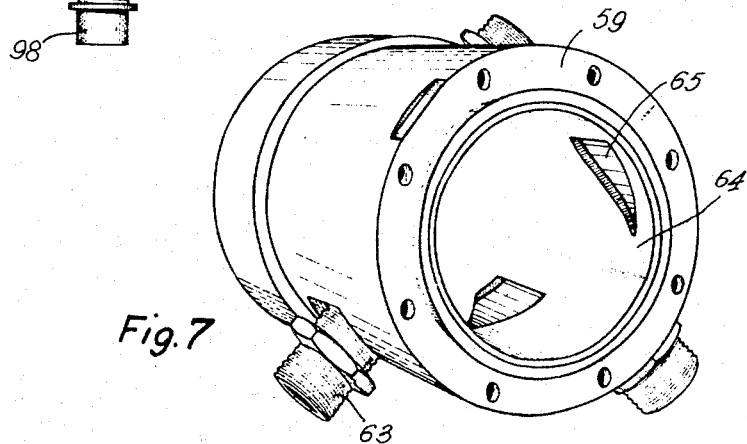
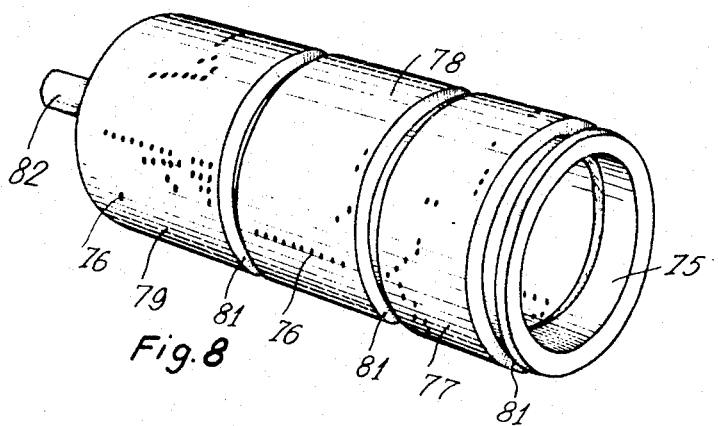

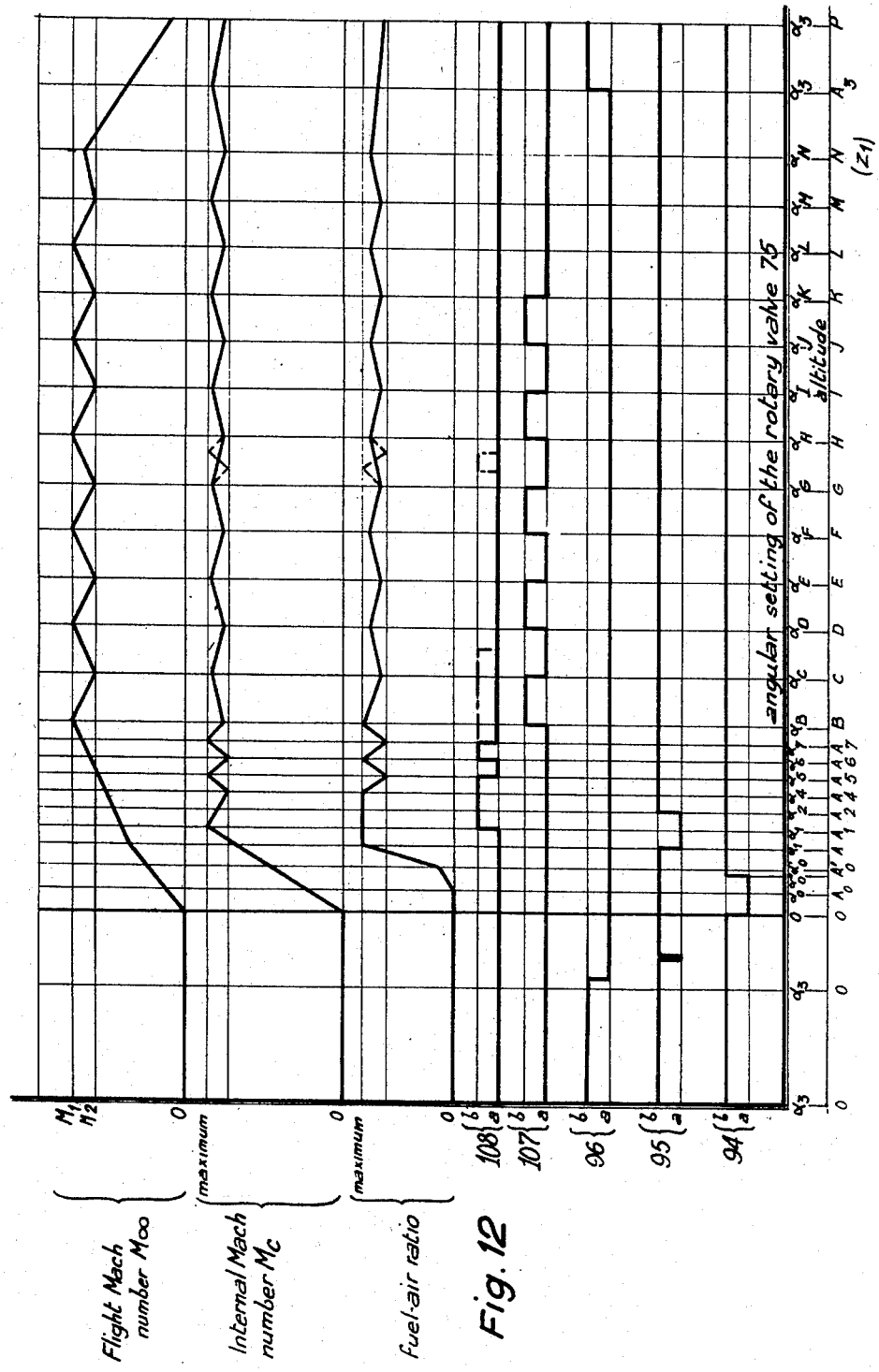

2,954,667

DEVICES FOR CONTROLLING THE FUEL FEED OF SUPERSONIC RAM JETS

Marcellin Marie Laurent, Cannes, and Lucien Louis Trousse, La Roquette-St-Jean, France, assignors to Sud-Aviation Nationale de Constructions Aeronautiques Filed Oct. 11, 1956, Ser. No. 615,332

Claims priority, application France Oct. 12, 1955

9 Claims. (Cl. 60—35.6)

The present invention relates to a device for regulating the fuel feed of a supersonic ram jet mounted on an aircraft or missile whereby after its launching by means of an auxiliary device the velocity of flight of the aircraft or missile is accelerated up to a certain cruising Mach number and subsequently maintained in the vicinity of this cruising Mach number irrespective of its path inclination with respect to the ground and of its manoeuvres, up to a critical altitude at which the ram jet thrust, even at optimum richness or fuel-air ratio value, becomes insufficient to permit the flight of the aircraft or missile in the vicinity of said cruising Mach number.

First of all, it must be borne in mind that the term "richness" or "fuel-air ratio" as used herein with reference to a ram jet designates the product of a constant subordinate to the nature of the fuel to be used by the ratio existing between the weight of the fuel fed to the ram jet and the weight of the air stream flowing through the apparatus.

This invention relates to a method of regulating the fuel feed of a supersonic ram jet according to which, after having determined two cruising Mach numbers very close to each other and between which the fuel-air ratio at a constant internal Mach number in the duct of the ram jet is substantially constant and subsequent to the ignition phase as the aircraft or missile is being propelled by auxiliary means, (a) The ram jet is fed with fuel during the acceleration period following this ignition phase, then at a constant internal Mach number and with a fuel output adjusted by this internal Mach number, until the upper predetermined cruising Mach number is attained, (b) Then the ram jet is fed with fuel, up to the critical altitude, by alternately reducing the output from the point where said upper cruising Mach number is attained until said lower predetermined cruising Mach number is attained and at a substantially constant fuel-air ratio at said constant internal Mach number between said lower and upper cruising Mach numbers, (c) Finally, beyond said critical altitude, the ram jet is fed with fuel by reducing the output down to a minimum preadjusted output.

The maximum output is adjusted as a function of the maximum fuel-air ratio characteristics which the combustion device can withstand, with due consideration for the speed attained upon cessation of propulsion by the auxiliary device.

The main object of this invention is to provide a device for regulating the fuel feed of a supersonic ram jet mounted on a supersonic flying machine, this device comprising an automatic fuel-flow controlling unit servo-controlled by a first apparatus for regulating the cruising Mach number and by a second apparatus for regulating the internal Mach number in the duct of the ram jet in order to maintain a substantially constant fuel-air ratio in the acceleration phases of the machine and to limit said fuel-air ratio at a predetermined value in the deceleration phases of said machine, these regulating apparatus being responsive to the corresponding Mach number at a threshold very close to the value to be regulated by these apparatus, this value differing for each of them.

According to an advantageous form of embodiment of this invention the apparatus for regulating the Mach number are adapted to close or open an electric contact incorporated in their structure and inserted in the supply line of an electromotor adapted to rotate in one or the other direction and drivingly connected to a fuel-flow regulator. Preferably, this fuel-flow regulator comprises a rotary sleeve-valve drivingly connected to said electromotor and having gauged or calibrated orifices formed through its wall for distributing the fuel through these orifices to the injection annular harness or harnesses of the combustion system of the ram jet. The fuel-flow regulation is obtained by rotating said rotary sleeve-valve in one or the other direction under the combined control action exerted by the two Mach-number regulating apparatus on the field windings of the two-way electromotor.

The device of this invention takes due account of the fact that the Mach number in the inner section of a supersonic ram jet comprising the initial portion of a sonic outlet neck is dependant on the cruising Mach number, on the altitude and also on the fuel-air ratio, and that if the internal Mach number is kept constant the fuel-air ratio is only a function of the altitude and of the cruising Mach number.

The values limiting the threshold of the apparatus for regulating the cruising Mach number are so determined that the fuel-air ratio remains substantially constant between these two values, irrespective of the altitude. Thus, this apparatus for regulating the cruising Mach number is effective for either maintaining this cruising Mach number between two predetermined Mach numbers on grounds of flight requirements, or acting as a means for controlling the fuel-air ratio.

The regulating system according to this invention is designed to keep to a constant value the internal Mach number while limiting the fuel-air ratio to an acceptable value due to the control action exerted by the apparatus for regulating the cruising Mach number in view of preventing the aircraft or missile from attaining speeds inconsistent with the resistance of its structure, for without this limitation the constant internal Mach number regulation, which is not a constant fuel-air ratio regulation, might originate prohibitive fuel-air ratio values for high cruising Mach numbers, in the case of certain combustion systems.

The two apparatus for regulating the Mach numbers act somewhat like on-off machmeters.

Other features and advantages of this invention will appear as the following description proceeds with reference to the accompanying drawings illustrating diagrammatically by way of example a typical embodiment of the invention. In the drawings:

Figure 1 is a diagrammatical section showing a supersonic ram jet having a central body and wherein the fuel feed of the combustion device is controlled by a regulating device according to the invention; however, in this figure the electric circuit or wiring system is not illustrated;

Figure 4 is a longitudinal section showing the regulator of the rotary-valve type;

Figure 5 is an end view of the rotary-valve regulator of Fig. 4, as seen in the direction of the arrow F;

Figure 6 is an end view showing the inside of the feed regulator of Figs. 4 and 5, the cover thereof being removed to show the three reversing switches forming part of this regulator;

Figure 7 is an isometric view showing the regulator body equipped with its ported sleeve;

Figure 8 is a similar isometric view showing the rotary sleeve-valve of the regulator of Fig. 4;

Figure 9 is a diagram in which the cruising Mach numbers are plotted against the altitude during the flight of a ram-jet aircraft equipped with the regulating device of this invention;

Figure 10 is another diagram showing the fuel output values obtained in each fuel feed or injection harness as a function of the angular setting of the rotary sleeve-valve of the regulator;

Figure 11:
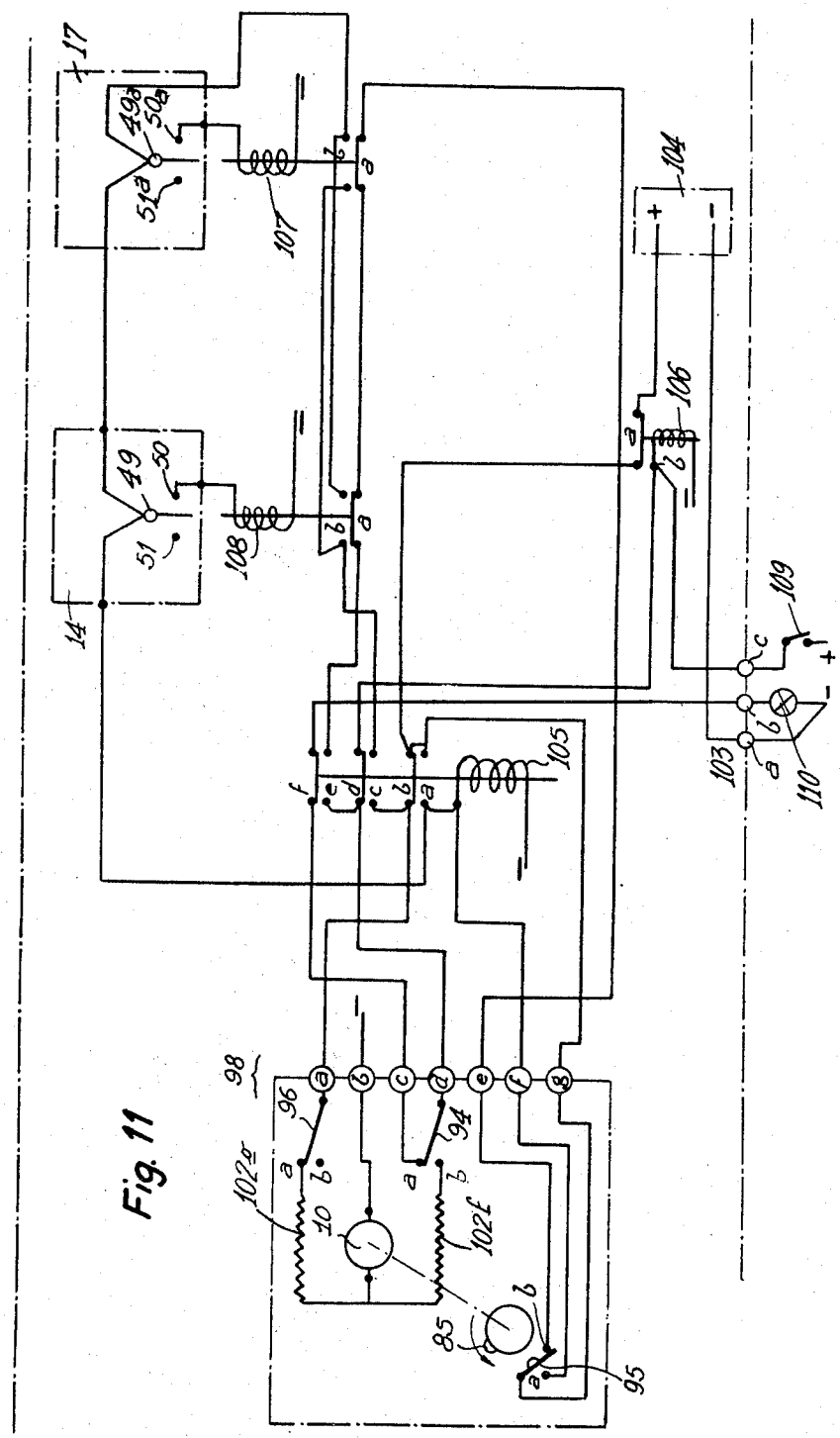

Figure 11 is a wiring diagram of the electric control system provided for controlling the regulating device of this invention, the different elements of the circuit being illustrated in their 0 positions or before the start; and Figure 12 shows the positions of the movable contacts of the micro switches controlling the starting position, the regulation release and the stop position of the device, those of the movable contacts controlled by the Mach number regulators, the fuel-air ratio and the internal and cruising Mach numbers plotted against the altitude as in Figure 9.

In the arrangements illustrated in Figs. 1 and 4 to 8, the regulator shown is associated, by way of example, to the fuel-feed system of a supersonic ram jet having three annular feed harnesses of the type described in the U.S. patent application Serial No. 582,777, filed May 4, 1956, in the name of Lucien Louis Trousse and assigned to Société Nationale de Constructions Aéronautiques du Sud-Est.

A ram jet of this character, as illustrated diagrammatically in Fig. 1, comprises a cylindrical housing in which the combustion device 2 is mounted on the pointed end of the rear tapered portion 3 of a central core 4 of which the front tapered portion 5 projects from the front air inlet of the diffuser. The combustion device comprises three annular injection harnesses, that is, a leading annular harness 6 feeding the pilot flames and two adjacent annular harnesses 7, 8 feeding the main injection system (not shown).

The regulator proper comprises a fuel-flow controlling device 9 driven from an electromotor 10 and controlling the three feed circuits 11, 12 and 13 of harnesses 6, 7 and 8. The operation of the electromotor 10 is controlled by an apparatus 14 for regulating the internal Mach number which is arranged within the central core 4 and connected to a static pressure intake 15, to a total-pressure intake 16, both of which are arranged in the subsonic diffuser, and also to a cruising Mach number regulating apparatus 17 disposed in the front tapered end 5 of the central core and connected to a static-pressure intake 18 and to a total-pressure intake 19, both of which are arranged ahead of this front tapered end 5 of the central core.

Figure 2:
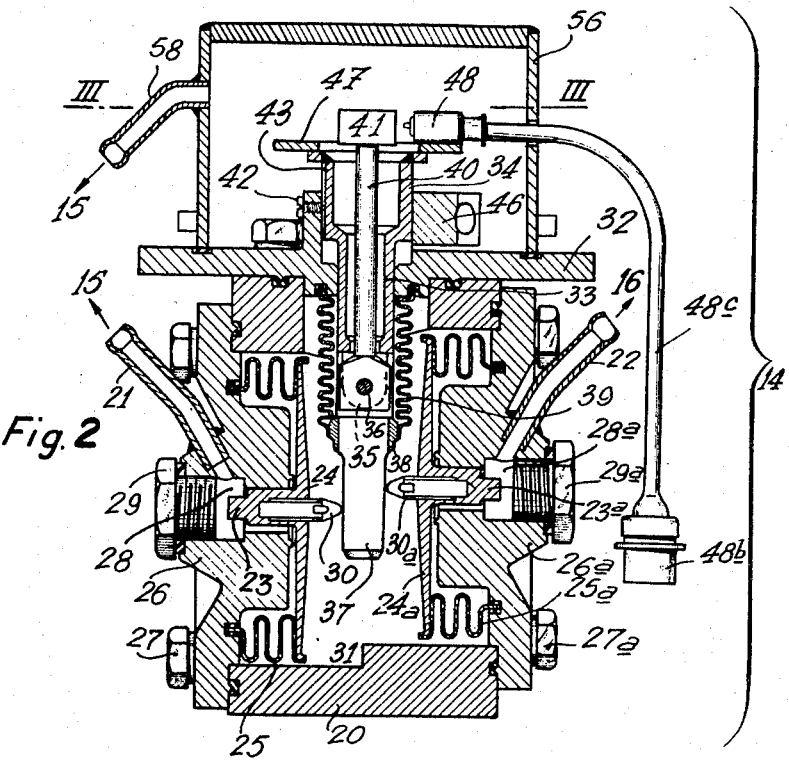
Figure 2 is a vertical diametral section taken across a Mach number regulating apparatus according to this invention.
Figure 3:
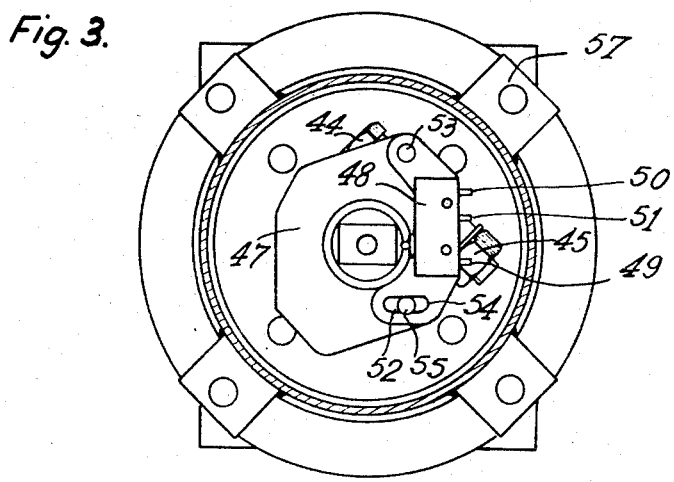
Figure 3 is a section taken upon the line III—III of Fig. 2.

Figures 2 and 3 illustrate the apparatus 14 for regulating the internal Mach number. This apparatus comprises a body 20 having secured thereon a pair of pressure-controlled diaphragms of bellows configuration connected through pipes 21 and 22 to the static-pressure intake 15 and to the total-pressure intake 16, respectively. The pressure diaphragm connected to the pipe 21 comprises a piston 23 formed with an integral disc-shaped head 24 connected through a diaphragm 25 to a diaphragm cover 26 secured by screws 27 on the body 20 of the regulating apparatus 14. This diaphragm cover 26 has formed therein a chamber 28 closed by a screw plug 29 and connected through the aforesaid pipe 21 to the static-pressure intake 15. The piston 23 has a tappet extension 30 projecting beyond the disc-shaped head 24 and this tappet 30 is screwed in the piston to permit the adjustment thereof. The pressure diaphragm connected to the pipe 22 is constructed in the same manner and its component elements are designated by the same reference numerals followed by the index letter a.

The central chamber 31 formed in the body 20 between the aforesaid pressure diaphragms is a vacuum space closed by an upper plate 32 and a socket 33 formed with a larger upper end 34 and a yoke 35 at its lower end extends through this plate 32, as shown. The yoke 35 has pivoted thereon through a yoke pin 36 a two-armed lever of which the lower arm 37 projects in the chamber 31 and is engaged by the aforesaid tappets 30, 30a. A ring 38 is welded on this arm 37 to secure a diaphragm 39 also of bellows configuration providing a fluid-tight seal between the vacuumized chamber 31 and the surrounding atmosphere. The upper arm 40 of the two-armed lever carries at its upper free end a head 41 secured thereon and adapted to oscillate within the socket 33 and also within the larger portion 34 thereof, as shown, under the control action exerted by the tappets 30, 30a on the lower arm 37. The upper larger portion 34 of socket 33 is adapted to be set in different axial positions to adjust the two-armed lever with respect to the tappets 30, 30a. To this end, the socket 33 is held against rotation by a screw 42 projecting in a longitudinal groove 43 formed in this larger end 34, the assembly being locked in its adjusted position by tightening a nut 45 on a bolt 44, to clamp thereon a split bearing 46 formed integrally in the plate 32.

The larger end 34 carries a flange 47 having secured thereon a microswitch 48 having three fixed contact studs or terminals 49, 50 and 51 for a purpose to be described presently the last one being a dead contact stud. The contact studs 49 and 50 are fed through a multiple conductor 48c connected to a multiple connector 48b. This microswitch 48 is carried by a lever 52 pivoted at 53 on the flange 47 and adapted to permit the adjustment of the position of the microswitch 48 relative to the head 41 of the two-armed lever by displacing the slot 54 engaged by a locking screw 55. On the aforesaid plate 32 a sealed housing 56 is secured by means of fixation lugs 57 and connected through a pipe 58 to the static-pressure intake 15.

The apparatus so far described operates as follows:

As long as the total-pressure responsive tappet 30a is less effective on the lever arm 37 than the static-pressure responsive tappet 30, the head 41 cannot operate the microswitch 48. When the tappet 30a becomes more effective than the tappet 30 it causes the two-armed lever to oscillate clockwise and its head 41 actuates the microswitch 48. This action may be adjusted by properly setting the socket 33, 34 relative to the plate 32 in consideration of the relative positions of tappets 30 and 30a with respect to the registering arm of lever 37, that is, as a function of the ratio of the total pressure to the static pressure, this ratio being a function of the Mach number alone. In fact, assuming that $a$ is the vertical distance measured from the axis of the yoke pin 36 to the lever-engaging end of tappet 30a, and $b$ the vertical distance measured between the two lever-engaging ends of tappets 30a and 30, calculation will show this ratio is equal to $$\frac{b+a}{a}$$

The upper chamber in which the upper arm of the two-armed lever oscillates is connected to the static-pressure intake 15 so as to maintain maximum stability conditions for the atmosphere therein.

The crusing Mach number regulating apparatus 17 may consist either of a conventional contact machmeter or of the same device as that described hereinabove for regulating the internal Mach number. In this case, the only differences will reside in the relative positions of the yoke pin 36 and tappets 30, 30a, as well as in the dimensions of the pressure diaphragms which must be responsive to another Mach number.

The fuel-flow controlling device 9 illustrated in Figs. 4 to 8 of the drawings comprises a a cylindrical case 59 having formed therein three flat annular grooves 60, 61 and 62 connected through nipples 63 to the injection annular harnesses 6, 7 and 8 of the combustion system of the ram jet. The case 59 has housed therein a fixed sleeve member 64 having ports 65 formed therein which communicate with the grooves 60 to 62 respectively. The case 59 is closed at one end by a flange 66, a suitable sealing gasket 67 being interposed therebetween, and a cover plate 68 closes the opposite end of the case with the assistance of another sealing gasket. A pipe fitting 69 connected to the fuel feed pipe leading from the fuel tank is mounted coaxially with the case 59 on the flange 66 to which it is secured by a nut 70. Between the fitting 69 and a washer 71 an aluminum sheet diaphragm 72 is clamped for a purpose to be defined presently. The flange 66 is formed with an inner cylindrical threaded portion 73 having a cylindrical filter 74 screwed thereon.

A pivoting sleeve valve 75 formed with a number of gauged or calibrated orifices 76 (see Fig. 8) is adapted to rotate by sliding on the inner cylindrical surface of the stationary sleeve 64. This sleeve valve is divided into three portions 77, 78 and 79 corresponding to the grooves 60, 61 and 62, respectively, by gaskets 80 fitted in grooves 81 formed in the sleeve valve 75.

This sleeve valve 75 terminates at the end opposite to the fitting 66 with a stub shaft 82 extending through the cover plate 68 and having keyed thereon a toothed wheel 83 secured to a drum piece 84 carrying a screw 85 for controlling the reversing switches as will be explained presently.

The toothed wheel 83 is in constant meshing engagement with a pinion 86 keyed on a shaft 87 having its opposite end 88 formed to constitute a split clamp so that by tightening a transverse bolt 89 the shaft 87 may be safely coupled to the splined shaft 90 of the two-way electromotor 10 secured on the device case by means of a strap 92.

The transmission comprising the pinion 86 and toothed wheel 83 is enclosed in a cover 93 having secured on its inner wall three microswitches adapted to be actuated by the control screw 85 rotatable with the toothed wheel 83; in the embodiment illustrated, microswitch 94 controls the starting position, microswitch 95 the regulation release, microswitch 96 the stop position at the end of the stroke. These microswitches and the electromotor are fed with current through a multiple conductor 97 having a corresponding connector 98 at its outer end.

The flange 66 has formed therein a first fitting 99 to permit the filling of the device and another fitting 100 acting as an intake of fuel-pressure measuring means. The fitting for feeding the annular harness 8 through the groove 62 of the regulator is provided with a swivelling pipe connector 101.

The fuel output supplied by the fuel-flow controlling device is a function of the cross-sectional area of the orifices 76 and also of the number of orifices uncovered by the cross-sectional area of the corresponding port 65 of the stationary sleeve 64. This output is modified when the movable sleeve valve 75 is pivoted within the stationary sleeve 64, and the law of output variation is dependant on the arrangement of these orifices 76 on the surface of the sleeve valve and may therefore be selected at will for each fuel-feed annular harness.

The fuel-flow controlling device will be considered as opening when the angular setting of the rotary sleeve valve varies from the zero starting position 0 (Figure 10) towards the position $\alpha_3$ corresponding to the flight beyond the critical altitude and conversely as closing when said angular setting varies in the fraction $\alpha_3 0$.

As illustrated in the wiring diagram of Fig. 11, the electromotor 10 has two field windings $102o$ and $102f$ and is connected together with the microswitches 94 to 96 to the wire connector 98 having seven contacts $98a$ to $98g$.

The electrical equipment comprises a connector 103 having three contacts $a$, $b$, $c$, connected to the negative terminal of the storage battery 104 of the aircraft, to a back contact $f$ of a relay 105 acting as a regulation starting relay, and to an energizing contact $b$ of a relay 106 having its back contact $a$ connected to the positive terminal of the battery 104 and also to a back contact $b$ of relay 105. The other contact $b$ of relay 106 is connected to a back contact $d$ of relay 105.

The contact $50a$ of the microswitch associated with the apparatus 17 for regulating the cruising Mach number is connected to a relay 107 whilst the contact 50 of the microswitch associated with the apparatus for regulating the internal Mach number 14 is connected to another relay 108. The back contacts $a$ of relays 107, 108 are interconnected in series between a front contact $e$ of relay 105 and contact $98e$ of connector 98. The front contacts $b$ of these relays 107 and 108 are interconnected in parallel between a front contact $c$ of relay 105 and a front contact $a$ of the same relay 105 through contacts 49, $49a$ of the microswitches associated with the aforesaid Mach number regulating apparatus.

Finally, contact $98a$ of connector 98 is connected to the back contact $b$ of relay 105 and to the movable contact of microswitch 96; contact $98b$ is connected to the negative terminal of the battery and to the armature of the electromotor 10, contact $98c$ to the back contact $f$ of relay 105 and to contact $a$ of microswitch 94, contact $98d$ to the back contact $d$ of relay 105 and to the movable contact of microswitch 94, connector $98e$ to contact $b$ of microswitch 95, contact $98f$ to the winding of relay 105 and to contact $a$ of microswitch 95 and finally contact $98g$ to the front contact $a$ of relay 105 and to the movable contact of microswitch 95.

The front contact $a$ of relay 105 is connected on the one side to the winding of this relay and on the other side to its back contact $b$, its front contact $c$ being connected to the back contact $b$ and its front contact $e$ to its back contact $d$.

The device described hereinabove operates as follows with reference to Figures 9 to 12:

At rest before the start, the aircraft is connected through connector 103 to a control board provided with a waiting switch 109 in open condition and connected to the positive terminal of a source of current and to the contact $103c$, and a tell-tale lamp 110 is connected to the negative terminal of this source of current and to the contact $103b$. The contact $103a$ is connected to the negative terminal of the aforesaid source of current. The movable contacts of microswitches 94, 95 and 96 respectively engage the contacts $94b$, $95b$ and $96b$ and the rotary sleeve valve is in the angular setting $\alpha_3$ (Figure 10) which engagement and setting were attained at the end of the preceding flight of the supersonic flying machine.

Shortly before the start, for example 30 seconds before the start, switch 109 is closed to set the device in its waiting condition. The relay 106 is fed through connector 103 and disconnects the positive terminal of the battery from the regulated circuit by passing from the back position $106a$ to the front position $106b$. At the same time, the positive terminal of the control board is fed through the front contact $106b$ and back contact $105d$ to the connector contact $98d$. The movable contact of microswitch 94 engaging the contact $94b$, the field winding $102f$ is energized and controls the operation of the electromotor 10 to cause the fuel-flow controlling device to be closed toward the zero starting position by rotating the rotary sleeve valve from the angular setting $\alpha_3$ to the angular setting 0 (Figures 10 and 12). During this rotary movement the control screw 85 releases the movable contact of microswitch 96 to move same into engagement with contact $96a$, then bears on the movable contact of microswitch 95 to engage contact 95a and releases said last movable contact which engages anew contact 95b. When the movable sleeve valve 75 is in this zero position, the control screw 85 actuates the movable contact of microswitch 94 to cause same to engage the fixed contact 94a thereof, thereby de-energizing the electromotor towards the closing position of the fuel-flow controlling device.

At the same time the contact 98c is energized and closes the circuit of the tell-tale lamp 110 across the back contact 105f and contact 103b. This lamp 110 lights up to indicate that the regulator is in its zero position, that the relay 105 is de-energized and that, consequently, the regulation is not started.

At the start, the missile or aircraft is launched by auxiliary means such as a powder-propelled engine or rocket booster operating independently of speed or efficient at low speeds only. The fuel tank is pressurized by air expanded by means of a pyrotechnic firing-pin device operating at the zero moment. When the pressure within the fuel tank has attained a predetermined value equal to the calibration pressure of diaphragm 72, the latter bursts and the fuel-flow controlling device is then fed with fuel from the tank. The time delay occurring from the percussion or firing time and the actual supply of fuel to said device is determined by the volume of air acting as a buffer in the fuel tank and by the calibration of this diaphragm 72.

At the same time the connector 103 is pulled away. The relay 106 is thus de-energized and resumes its initial position in which it connects the positive terminal of the battery on the one hand through the back contacts 105b to the contact 98a of a connector 98, and on the other hand through the contact 98g to the movable contact 95a of microswitch 95. The current fed through the contact 98g and microswitch 95 is transmitted through the contact 98e to the back contacts 107a and 108a but cannot energize the electromotor as the relay 105 is not energized. The field winding 102o fed through contact 98a and microswitch 96 causes the electromotor 10 to rotate the sleeve valve 75 in the opening direction from the starting position 0 until the angular position $\alpha_1$ is attained by this valve (see Fig. 10). Meanwhile, in the angular position $\alpha_0$ the movable member of microswitch 94 has escaped from the control screw 85 for engaging contact 94b and in this position $\alpha_1$ the microswitch permits the rotation of the electromotor in the closing direction, i.e. in the direction $\alpha_3 0$ when current fed to the contact 98d is applied to the field winding 102f.

At the same time, in this position $\alpha_1$ the movable contact of microswitch 95 actuated by the control screw 85 engages the stationary contact 95a to energize the contact 98f and the winding of relay 105 which is thus self-energized. The energization of this relay 105 initiates the regulating action and supplies current to the contacts of the microswitches of the Mach number regulating apparatus as well as to relays 107 and 108. The connector contacts 98a and 98d are thus fed only through the wires leading from these relays 107 and 108 controlled by the Mach number regulating apparatus.

In the time period elapsing from zero time to the time corresponding to the aforesaid angle $\alpha_{1'}$ the cruising Mach number follows the portion OA of the curve illustrated in Fig. 9. The diagrams of Figs. 9 and 10 show that at the angle $\alpha_0$ corresponding to the bursting of diaphragm 72 and to the cruising Mach number $A_0$, the fuel injection annular harnesses 6 and 7 are fed with fuel, thereby ensuring the ignition of the pilot burners; then, at the angle $\alpha'_0$ corresponding to the cruising Mach number $A'_0$ the last injection annular harness 8 providing the major portion of the fuel output after the ignition of the pilot flames is also fed with fuel. The law according to which the harnesses are fed between the angles $\alpha_0$ and $\alpha_1$ (Figure 10) is determined as a function of the law of acceleration of the missile or aircraft by the auxiliary launching means, i.e. as function of time.

In this angular position $\alpha_1$ the orifices 76 in the rotary sleeve valve 75 provide the maximum cross-sectional flow area to the ports 65 of the stationary sleeve 64. The fuel-flow controlling device is in its maximum preadjusted fuel output position and the aircraft speed is accelerated. Due to this acceleration, the fuel-air ratio decreases but on the other hand the increase in altitude tends to increase the fuel-air ratio.

If the acceleration effect of the aircraft prevails over the altitude effect, which is the case of a ground-to-ground aircraft, the contact of the internal Mach number regulating apparatus 14 is open and the relay 108 is not energized. Since the aircraft has not yet attained the predetermined cruising Mach number $M_1$ the contact of the cruising Mach number regulating apparatus 17 is also open and the relay 107 is not energized.

As the movable contact of microswitch 95 engages its fixed contact 95a, the connector contacts 98a and 98d are not supplied with current, the electromotor is stopped and the fuel-flow controlling device remains in the preadjusted maximum output position during this acceleration until the predetermined upper cruising Mach number $M_1$ is attained.

If the altitude effect prevails, as in the case of a ground-to-air aircraft, it produces an increase in the fuel-air ratio. As long as the maximum fuel-air ratio defining the internal Mach number $Mc=0.55$, for example, to which the internal Mach number regulating apparatus 14 is responsive, is not attained, the relay 108 is not fed and the fuel-flow controlling device remains in its angular position $\alpha_1$ ensuring the maximum preadjusted output. When this maximum fuel-air ratio is attained, for a cruising Mach number $A_1$, the internal Mach number decreases and the pressure diaphragms cause the control lever of the internal Mach number regulating apparatus 14 to actuate the microswitch 48 associated therewith, thereby causing the movable contact 49 to engage the fixed contact 50. Thus, relay 108 is energized and its front contact 108b supplies current through the contacts 105c and 105b to the connector contact 98a which feeds the field winding 102o through the microswitch 96. The electromotor rotates in the direction to open the fuel-flow controlling device until the rotary sleeve valve attains the angular position $\alpha_2$ the cruising Mach number attaining the value $A_2$. From this position if the opening of the fuel-flow controlling device continues the fuel output decreases according to the law shown in Fig. 10 on the right-hand side of the abscissa $\alpha_2$. At the same time, in this position $\alpha_2$ the movable contact of microswitch 95 escapes from the control screw 85 and engages the fixed contact 95b.

From a certain position $\alpha_4$ of the rotary sleeve valve 75 corresponding to a cruising Mach number $A_4$ and in which the internal Mach number attains its maximum value, the fuel output becomes inadequate to provide the required fuel-air ratio, the internal Mach number increases and the contact 49 of the internal Mach number regulating apparatus 14 is opened and engages the dead contact 51, thereby de-energizing the relay 108 in the angular position $\alpha_5$ of the rotary sleeve valve corresponding to a flight Mach number $A_5$. The threshold between the sticking and opening of this contact is of the order of 0.01 to 0.02 Mc. At this time, due to the fact that, as already explained hereinabove, the microswitch 95 has its movable contact engaged on the fixed contact 95b, the back contacts 107a and 108a are supplied with current and, since the movable contacts of relays 107 and 108 in their de-energized condition engage these back contacts, current is supplied across contacts 105e and 105d to the connector contact 98d, thereby energizing the field winding 102f controlling the operation of the electromotor 10 in the proper direction to close the fuel-flow controlling device from $\alpha_5$ toward 0. The fuel output increases with the altitude, the fuel-air ratio also increases while the internal Mach number decreases due to the damping effect exerted by the burnt gases which restrain the circulation of air through the ram-jet engine. The regulating apparatus 14 closes the contact through which the relay 108 is energized for the angular position $\alpha_6$ of the rotary sleeve valve 75 corresponding to a cruising Mach number $A_6$ position wherein the internal Mach number attains the lower limit of the operative threshold of regulator 14, and the cycle is resumed.

In the diagrams shown in full line in Figure 12 it has been assumed that a single supplementary cycle is effected, the fuel-flow controlling device opening from $\alpha_6$ to $\alpha_7$ corresponding to a cruising Mach number $A_7$, with decreasing of fuel output and fuel-air ratio while the internal Mach number increases up to its maximum value; then said fuel-flow controlling device closes from $\alpha_7$ to $\alpha_B$, the fuel output and fuel-air ratio increases while the internal Mach number decreases down to the lower limit of the threshold of regulator 14.

During this period, the cruising Mach number follows the portion $A_6A_7B$ of the curve of Fig. 9.

When the cruising Mach number attains at B the upper predetermined cruising value $M_1=2$, for example, the pressure diaphragms of the crusing Mach number regulating apparatus 17 actuate the double lever thereof so as to cause same to actuate in turn the microswitch of said apparatus 17 and thus its movable contact 49a engages the fixed contact 50a thereof. Thus, the relay 107 is energized and its movable contact engages the front contacts 107b. Under these conditions, and whether the relay 108 controlled by the internal Mach number regulating apparatus 14 is energized or not, the connector contact 98a is fed across the contacts 105c through contacts 105b connected to contact 105c to energize the field winding 102o. The electromotor rotates in the direction $\alpha_B$ towards $\alpha_3$ to open the fuel-flow controlling device while causing a reduction in the fuel output by driving the rotary sleeve valve to the angular position $\alpha_3$ (Fig. 10). Due to the reduction in fuel output the aircraft decelerates and the cruising Mach number follows the portion BC of the curve of Fig. 9, while the internal Mach number increases and the fuel-air ratio decreases.

When the threshold of contact-holding of the cruising Mach number regulating apparatus 17 is exceeded, that is, when the cruising Mach number has dropped to the predetermined lower value $M_2$ (which may be from 0.01 to 0.02 below $M_1$), at C corresponding to the angular portion $\alpha_c$ of the rotary sleeve valve 75, contact 49a is removed from contact 50a and relay 107 becomes de-energized. Then, the constant internal Mach number fuel-air ratio regulation alone is effective, thereby producing an accelerated phase in which the connector contact 98d and field winding 102f are fed, as already explained.

If, as illustrated in full line in Figure 12, for the angular position $\alpha_B$ and the cruising Mach number B the internal Mach number has a value slightly greater than the lower limit of the threshold of regulator 14, relay 108 is not energized. The fuel-flow controlling device closes from $\alpha_c$ to $\alpha_d$ with increasing of the fuel output and fuel-air ratio while the internal Mach number decreases. In the acceleration phases similar to the phase CD the relay 108 will be always considered as not energized.

The cruising Mach number will then follow the portion CD of the curve shown in Figs. 9 and 12.

When the cruising Mach number has again attained the value $M_1$ at D corresponding to the angular position $\alpha_d$ of the rotary sleeve valve 75, the cycle of operation described hereinabove is resumed, the cruising Mach number following in the deceleration phases of the aircraft the portions DE, FG, HI, JK and LM of the curve shown in Fig. 9, and in the acceleration phases of the aircraft the portions EF, GH, IJ, KL and MN of this curve, until the aircraft has attained the critical altitude $Z_1$ at which it cannot reach the upper cruising Mach number $M_1$. In the same phases the angular position of the rotary sleeve valve 75 varies in the opening direction from $\alpha_D$ to $\alpha_E$, from $\alpha_F$ to $\alpha_G$, from $\alpha_H$ to $\alpha_I$, from $\alpha_J$ to $\alpha_K$ and from $\alpha_L$ to $\alpha_M$, and in the closing direction from $\alpha_E$ to $\alpha_F$, from $\alpha_G$ to $\alpha_H$, from $\alpha_I$ to $\alpha_J$, from $\alpha_K$ to $\alpha_L$ and from $\alpha_M$ to $\alpha_N$. The higher the cruising Mach number at which the aircraft is travelling and the closer its path to the horizontal, the higher the aforesaid critical altitude.

It may be noted that during the entire upstream speed regulation phase the cruising Mach number of the aircraft oscillates between the two values M1 and M2 which it may slightly exceed on account of the time of response of the system. These values M1 and M2 may be very close to each other so that the flight of the aircraft will take place at a substantially constant cruising Mach number, irrespective of the inclination of its path with respect to the ground and to its manoeuvres.

From this critical altitude for which the rotary sleeve valve 75 attains the angular position $\alpha_N$, the relay 107 remains constantly de-energized since the cruising Mach number is lower than M1 and in this case the regulation is effected by the internal Mach number regulating apparatus 14, as already explained during the acceleration period of the aircraft which follows the launching thereof by auxiliary means, but, in the present period, with a continuous decrease in the fuel output down to the minimum output $m$ corresponding to the position $\alpha_3$ of the rotary sleeve valve, the value of this minimum output being determined by construction and such that under any flying conditions the upper limit-fuel-air ratio cannot be attained. When the rotary sleeve valve attains this angular position $\alpha_3$ corresponding to a cruising Mach number $A_3$, the control screw 83 actuates the movable contact of the microswitch 96 to switch same from contact 96a to contact 96b. The fuel-flow controlling device is stopped at the end of the opening stroke. From that time and until the cruising Mach number attains the value P the fuel-air ratio decreases as well as the internal and flight Mach numbers.

The dot and dash lines of Figure 12 represent the case when for the maximum cruising Mach number corresponding to B and $\alpha_B$ the relay 108 is energized. When under the action of the cruising Mach number regulation said Mach number attains the minimum value $M_2$ at C corresponding to the angular position $\alpha_c$ of the rotary sleeve valve 75, the energization of relay 108 causes the rotation of motor 10 in the opening direction with a decreasing of the fuel-air ratio until the internal Mach number attains the lower limit of the threshold of regulator 14. The relay 108 is then de-energized, the motor rotates in the reverse direction, i.e. in the closing direction with increasing of fuel-air ratio until the cruising Mach number attains its upper value $M_1$ at D corresponding to the angular position $\alpha_D$ of the rotary sleeve valve and the cycle continues as already indicated.

If, as illustrated in dash lines in Figure 12, the relay 108 is de-energized for the cruising Mach number G and the position $\alpha_G$ and if the internal Mach number decreases down to the lower limit of the threshold of regulator 14, the motor rotating in the closing direction, the relay 108 is then energized and causes said motor to rotate in the opening direction until the internal Mach number attains its maximum value while the fuel-air ratio decreases. At that time the relay 108 is de-energized and causes the motor to rotate in the closing direction, the fuel-air ratio increases until the cruising Mach number again attains its upper value $M_1$ at H corresponding to the angular position $\alpha_H$ of the rotary sleeve valve 75. The cycle continues as already indicated.

Of course, many modifications and alterations may be brought to the method and device described hereinabove without departing from the spirit and scope of the invention. Thus, for example, whenever the altitude effect is very important during the fuel-air ratio regulation period, the electric circuit connecting the contacts 95b, 98e, back contacts 107a, 108a, front contacts 105e and back contact 105d may be dispensed with. Thus, the enriching of the ram jet engine takes place simply by stopping the electromotor 10 when the internal Mach number regulating apparatus 14 has released the relay 108. The altitude increase under constant fuel output conditions is then sufficient to ensure the increase in fuel-air ratio until a value from which the internal Mach number regulating apparatus 14 controls the energization of the relay 108 is attained, and therefore, the electromotor 10 is rotated to reduce the fuel output to another constant output level.

Again, and without departing from the present invention, the fuel-flow controlling device is applicable to any suitable number of annular fuel-feed harnesses that may be provided in the ram jet, provided that said device comprises the number of grooves and of series of gaged orifices that correspond to the number of annular harnesses to be fed.

What we claim is:

1. A device for controlling the fuel feed of a supersonic ram jet mounted on a supersonic flying machine propelled by auxiliary means during the starting period and of the type having a cylindrical housing formed with a front subsonic diffuser and housing a central core provided with a front tapered portion projecting from the air inlet of said diffuser and with a rear tapered portion the pointed end of which carries a combustion device having at least one injection harness, comprising, in combination, an automatic fuel-flow controlling assembly adapted to feed at least said one injection harness of the combustion device of the ram jet, a cruising Mach number regulator for said ram-jet, an internal Mach number regulator sensitive to the Mach number through the cylindrical housing upstream of the combustion device, said two regulators being respectively responsive to different Mach numbers according to a very limited threshold about the values to be controlled thereby, and means for servo-controlling said automatic fuel-flow controlling assembly by said two regulators in order to maintain a substantially constant fuel-air ratio in the acceleration phases of the machine and to limit said fuel-air ratio at a predetermined value in the deceleration phases of said machine.

2. A device for controlling the fuel feed of a ram jet mounted on a supersonic flying machine propelled by auxiliary means during the starting period and having a combustion device housed in a combustion chamber, comprising, in combination, a first Mach number regulator adapted to maintain the internal Mach number through the combustion chamber upstream of the combustion device between two upper and lower limits close to each other about a predetermined maximum mean value, a second Mach number regulator adapted to maintain the value of the flight Mach number between two upper and lower values close to each other about a predetermined cruising Mach number, fuel-flow controlling means regulating the fuel flow delivered to the combustion device, means for operating said fuel-flow controlling means as long as the flying machine is propelled by auxiliary means so as to increase the fuel flow in relation to the time from a nil value to a maximum value, means operatively connecting said second Mach number regulator to said fuel flow controlling means each time the cruising Mach number attains its upper value so as to reduce the fuel flow in order to decrease said cruising Mach number down to its lower value, and means operatively connecting said first Mach number regulator to said fuel flow controlling means, firstly, as soon as the propulsion by auxiliary means is ended so as to maintain the fuel flow at its maximum value until the internal Mach number attains its maximum mean value then until the cruising Mach number attains its upper value to vary the fuel flow in relation to the variations of said internal Mach number between said limits in order to obtain a substantially constant fuel-air ratio, secondly, up to the critical altitude each time the cruising Mach number attains its lower value so as to increase the fuel flow in order to obtain said substantially constant fuel-air ratio until said cruising Mach number attains its upper value, and, thirdly, beyond said critical altitude so as to reduce the fuel flow at said substantially constant fuel-air ratio down to a predetermined minimum fuel flow.

3. A device for regulating the fuel feed of a supersonic ram jet mounted on a supersonic flying machine and of the type having a cylindrical housing formed with a front subsonic diffuser and housing a central core provided with a front tapered portion projecting from the air inlet of said diffuser and with a rear tapered portion the pointed end of which carries a combustion device having at least one injection harness, comprising, in combination, means for maintaining the internal Mach number within the cylindrical housing upstream of the combustion device at a substantially constant value as soon as the propulsion of the flying machine by auxiliary means is stopped, means for maintaining the cruising Mach number at a substantially constant value as soon as said number attains a predetermined value, means for maintaining the fuel-air ratio at a substantially constant value, in the acceleration phases of the machine, in relation to said internal Mach number, and means for limiting the fuel-air ratio in the deceleration phases of the machine, as a function of the cruising Mach number, at such a value that the flying machine cannot attain speeds inconsistent with the resistance of its structure.

4. A device for controlling the fuel feed of a supersonic ram jet mounted on a supersonic flying machine and of the type having a cylindrical housing formed with a front subsonic diffuser and housing a central core provided with a front tapered portion projecting from the air inlet of said diffuser and with a rear tapered portion the pointed end of which carries a combustion device having at least one injection harness, comprising, in combination, a rotary fuel-flow controlling device connected to the fuel feeding line of the ram jet, a two-way electromotor drivingly connected to said device, a fuel feeding pipe connecting said device to each injection harness of the combustion device, a first means for energizing said electromotor as long as the flying machine is propelled by auxiliary means in order to obtain a fuel-flow proportional to time, a second means for energizing said electromotor during the acceleration periods of said flying machine as soon as the propulsion by auxiliary means is stopped and as soon as said flying machine attains its critical altitude, a third means for energizing said electromotor during the deceleration periods of said flying machine until said flying machine attains its critical altitude, a cruising Mach number regulator, an internal Mach number regulator sensitive to the Mach number through the cylindrical housing upstream of the combustion device, said two regulators being respectively responsive to different Mach numbers according to a very limited threshold about the values to be controlled thereby, and means for servo-controlling said second and third energizing means by said two Mach number regulators in order to maintain a substantially constant fuel-air ratio in the acceleration phases of the machine and to limit said fuel-air ratio at a predetermined value in the deceleration phases of said machine.

5. A device, according to claim 4, wherein the means for servo controlling the second and third energizing means by the two Mach number regulators comprises two electric contacts adapted to be opened and closed by the two Mach number regulators as soon as the corresponding Mach numbers attain the lower and upper limits of the corresponding threshold, respectively, and inserted in the energizing circuit of the electromotor.

6. A device, according to claim 4, wherein the three means for feeding the electromotor comprise a rotary cam operatively connected to the electromotor, three reversing switches controlled by said rotary cam, inserted in the energizing circuit of said electromotor and adapted the first one to cause the rotation of said electromotor in the direction for closing the fuel-flow controlling device for causing said electromotor to attain its zero starting position, the second one to cause the rotation of said electromotor in the reverse direction, for opening said device to ensure the starting of the automatic regulation and the feeding of the combustion device with fuel, the third one to determine the stopping position of said electromotor at the end of the opening stroke of said regulator, and four relays inserted in the energizing circuit of said electromotor and adapted the first one to simultaneously operate the setting of said electromotor to the zero starting position at the starting time and the feeding of the energizing circuit from said starting time, the second one to ensure the starting of the automatic regulation, the third one connected to the cruising Mach number regulator for limiting the speed of the flying machine by maintaining the fuel-air ratio at a predetermined value under the action of the cruising Mach number regulator in the deceleration phases of the machine, and the fourth one connected to the internal Mach number regulator to maintain at a substantially constant value the fuel-air ratio under the action of the internal Mach number regulator in the acceleration phases of the machine.

7. A device, according to claim 4, wherein the rotary fuel-flow controlling device comprises a cylindrical case formed with inner annular grooves the number of which is equal to that of the injection harnesses of the combustion device, a fixed sleeve member housed in said case and having angularly shifted ports respectively communicating with said annular grooves, a hollow pivoting sleeve valve connected to the fuel feed line of the ram jet, housed in said sleeve member and formed with a number of gaged orifices and with outer annular grooves dividing the outer surface of said sleeve valve into parts the number of which is equal to that of said injection harnesses, gaskets fitted in said outer annular grooves and in contacting engagement with said sleeve member, a shaft connected to said sleeve valve, a transmission device interconnecting said shaft and the electromotor, and pipes connecting each one of said inner annular grooves to the corresponding injection harness.

8. A device, according to claim 4, wherein each Mach number regulator comprises two facing pressure controlled diaphragms of bellows configuration respectively submitted to the static pressure and to the total-pressure, two tappet members respectively secured on the centers of said diaphragms, located in the space separating said diaphragms and directed in opposite directions with respect to each other, a two-armed lever the position of which is adjustable with respect to said tappet members and on one arm of which said tappet members bears on either side thereof, the distance between the bearing points of said tappet members being a function of the ratio existing between the total pressure and the static pressure relating to said control apparatus, a chamber housing said arm of the two-armed lever and subjected to vacuum, a second chamber subjected to the static pressure and within which moves the other arm of said two-armed lever, and a microswitch located in said second chamber and the position of which is adjustable with respect to said other arm, said microswitch being inserted in the energizing circuit of the electromotor and being adapted to be actuated by said other arm so that it is closed and opened when the corresponding Mach number attains the upper and lower limits of the corresponding threshold, respectively.

9. A device for controlling the fuel feed of a supersonic ram jet mounted on a supersonic flying machine and of the type having a cylindrical housing formed with a front subsonic diffuser and housing a central core provided with a front tapered portion projecting from the air inlet of said diffuser and with a rear tapered portion the pointed end of which carries a combustion device having at least one injection harness, comprising, in combination, a rotary fuel-flow controlling device connected to the fuel feeding line of the ram-jet, a two-way electromotor drivingly connected to said device, a fuel feeding pipe connecting said device to each injection harness of the combustion device, an internal Mach number regulator arranged within the central core substantially in alignment with the outlet of the diffuser upstream of the combustion device, a static-pressure intake arranged on the outer surface of said central core near said internal Mach number regulator and connected thereto, a total-pressure intake arranged within the cylindrical housing downstream of the subsonic diffuser and connected to said internal Mach number regulator, a cruising Mach number regulator arranged within the front tapered portion of said central core, a static-pressure intake arranged on the outer surface of said front tapered portion and connected to said cruising Mach number regulator, a total-pressure intake arranged ahead of this front tapered portion and connected to said cruising Mach number regulator, said two regulators being respectively responsive to different Mach numbers according to a very limited threshold about the values to be controlled thereby, a first means for energizing said electromotor as long as the flying machine is propelled by auxiliary means in order to obtain a fuel flow proportional to time, a second means for energizing said electromotor during the acceleration periods of said flying machine as soon as the propulsion by auxiliary means is stopped and as soon as said flying machine attains its critical altitude, a third means for energizing said electromotor during the deceleration periods of said flying machine until said flying machine attains its critical altitude, and means for servo-controlling said second and third energizing means by said two regulators in order to maintain a substantially constant fuel-air ratio in the acceleration phases of the machine and to limit said fuel-air ratio at a predetermined value in the deceleration phases of said machine.

References Cited in the file of this patent

UNITED STATES PATENTS

| | | |
|---|---|---|
| 2,688,845 | Ostroff | Sept. 14, 1954 |
| 2,729,061 | Grafinger et al. | Jan. 3, 1956 |
| 2,742,761 | Mullen | Apr. 24, 1956 |
| 2,765,619 | Peterson | Oct. 9, 1956 |
| 2,789,417 | Kuzmitz | Apr. 23, 1957 |